United States Patent [19]

Cavanagh et al.

[11] 4,338,360
[45] Jul. 6, 1982

[54] METHOD FOR COATING POROUS METAL STRUCTURE

[75] Inventors: John R. Cavanagh, Brownsburg; Kenneth R. Cross, Lebanon; David L. Clingman, Carmel; Berton Schechter, Indianapolis, all of Ind.

[73] Assignee: General Motors Corporation, Detroit, Mich.

[21] Appl. No.: 145,594

[22] Filed: May 1, 1980

[51] Int. Cl.³ ............................................. B05D 5/00
[52] U.S. Cl. .................................. 427/247; 427/292; 427/327; 427/419.2; 427/427
[58] Field of Search .............. 427/299, 287, 309, 292, 427/327, 247, 243, 244, 261, 265, 419.2, 419.3, 419.4, 419.6, 421, 422, 424, 425, 427

[56] References Cited

U.S. PATENT DOCUMENTS

| | | | |
|---|---|---|---|
| 2,564,497 | 8/1951 | Navias | 431/356 |
| 2,588,422 | 3/1952 | Shepard | 427/427 |
| 2,867,112 | 1/1959 | Krone | 52/676 |
| 3,584,972 | 6/1971 | Bratkovich | 416/229 |
| 3,663,270 | 5/1972 | Blair | 427/427 |
| 4,004,056 | 1/1977 | Carroll | 428/138 |
| 4,055,705 | 10/1977 | Stecura et al. | 427/419.2 |

Primary Examiner—Norman Morgenstern
Assistant Examiner—S. L. Childs
Attorney, Agent, or Firm—J. C. Evans

[57] ABSTRACT

An improved method for coating a porous metal laminated structure having air flow holes on the coated side of the structure including in part, the steps of roughening an exposed surface of the porous laminated material and thereafter spraying a bond layer on the roughened surface at an angle selected to coat it with a thin bond coat layer while depositing only a limited amount of the bond coat material internally of the air flow holes and thereafter spray coating the bond coated surface with a top ceramic coat of heat resistant composition and characterized by requiring a bond coat for adherence to the porous metal laminated material and wherein the top ceramic coat spray angle is inclined opposite to that of the spray angle of deposition of the bond coat material to prevent deposition of the top coat on bond material internally of the air flow holes so as to prevent bonding of the ceramic top coat in the air flow holes thereby to minimize restriction of flow through the air flow hole in the exposed surface of the porous metal laminate.

4 Claims, 7 Drawing Figures

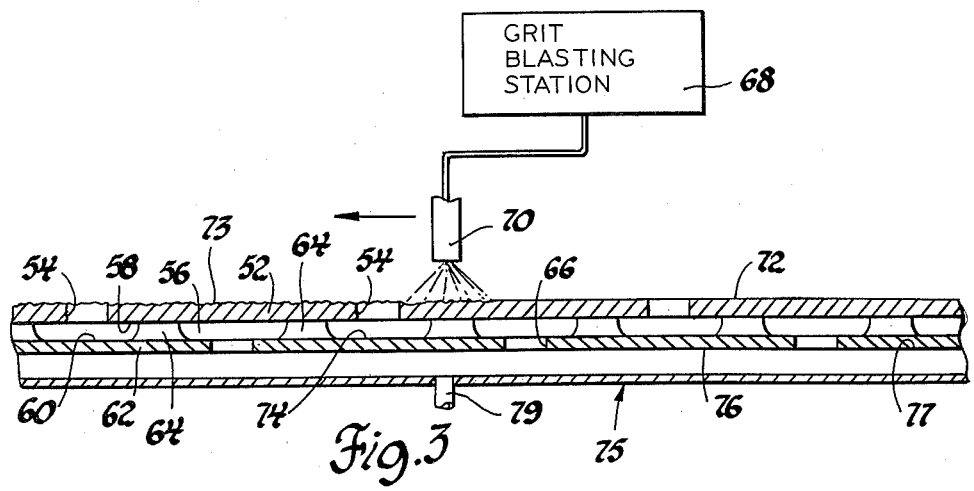
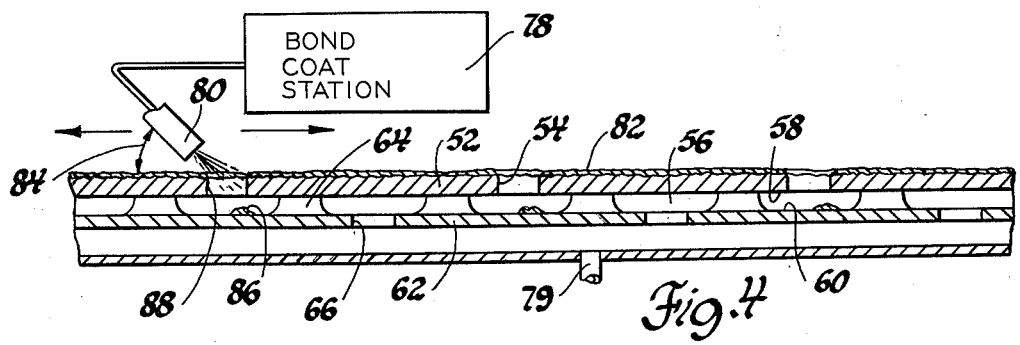
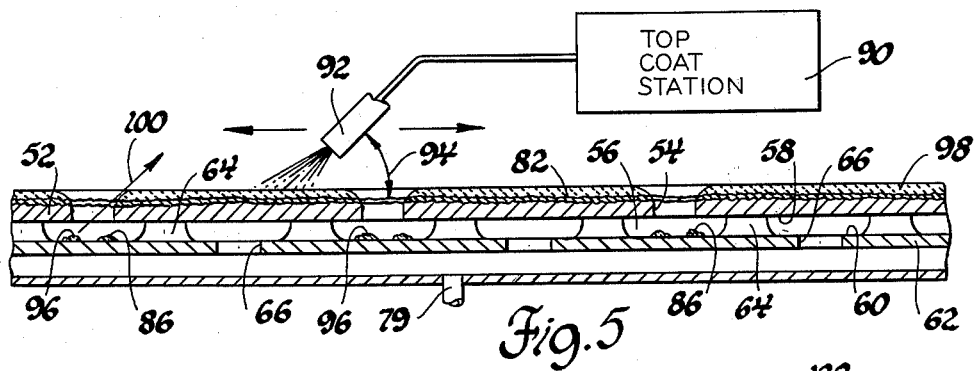
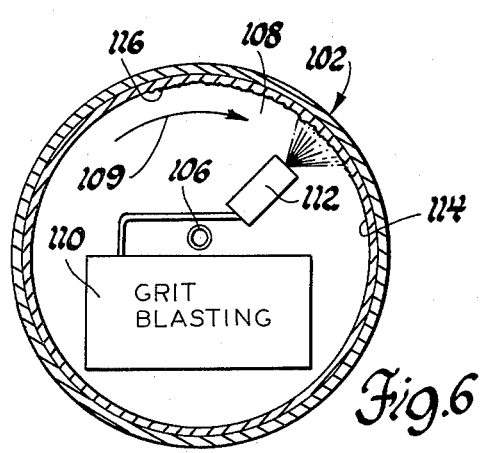
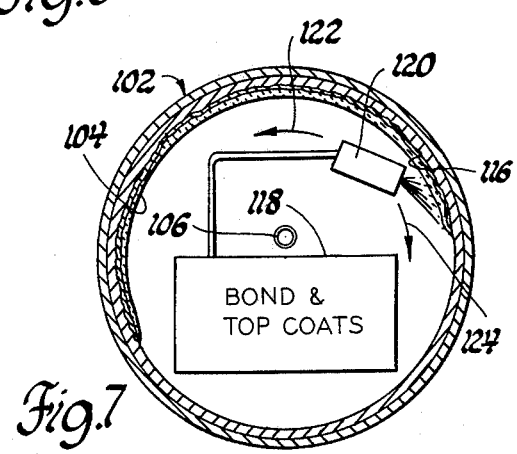

METHOD FOR COATING POROUS METAL STRUCTURE

The invention herein described was made in the course of work under a contract or subcontract thereunder with the Department of Defense.

This invention relates to porous metal laminated structures and more particularly to porous laminated structures having air flow holes on an exposed surface portion thereof in inner communication with a flow transfer passage and more particularly to an improved method for coating such material with a heat resistant ceramic composition on a heat exposed surface portion of the porous laminated material structure.

As the temperature of operation of gas turbine engine components increases, various approaches have been used to obtain better cooling of the heat exposed portions of the components. One example of such an approach is use of porous laminated material of the type set forth in U.S. Pat. No. 3,584,972, issued June 15, 1971, to Bratkovich et al for Laminated Porous Metal.

In addition to being utilized to form component wall portions of a combustor in a gas turbine engine, such material has a wide variety of applications including but not limited to use in shroud portions of turbine nozzle assemblies and for use in air foil vane and blade components of gas turbine engines.

Furthermore, it is recognized, as set forth in U.S. Pat. No. 2,564,497, issued Aug. 14, 1951, to Navias for Combustion Chamber Liner, that high temperature metallic components for gas turbine engines can be coated with ceramic compositions to withstand high temperature phases of operation of a gas turbine engine.

Use of ceramic coatings on porous laminated materials of the type set forth in the '972 patent, however, can cause undesirable closure of air flow holes on the surface that is coated with the heat resistant ceramic composition material.

Accordingly, an object of the present invention is to provide an improved method to coat a porous laminate having a plurality of spaced air flow holes in an exposed surface without plugging the holes and including the steps of: roughening the exposed surface and then applying a pressure differential of inert gas across the porous laminate to cause a flow of gas from the holes on the exposed surface; thereafter applying a bond coat layer on the exposed surface at an acute spray application angle to the plane of the exposed surface and at a rate to produce a thin bond coat layer on the planar extent of the exposed surface and on only a limited surface portion of an inner surface in part defining the internal passage communicating with the holes in the exposed surface; and thereafter spray coating the bond coat layer with a top ceramic coat of composition requiring a bond coat layer for adherence to the substrate and with a top coat spray angle opposite to the spray angle of the bond coat spray and at an acute angle to the plane of the exposed surface so as to cause the ceramic top coat material to be directed against the full planar extent of the bond coat that overlies the exposed surface of the laminate and only a limited portion of the inner surface defining the internal passage at a point spaced from the bond coat layer thereon so as to limit bonding of the ceramic coat in the hole in the exposed surface thereby to minimize flow restriction through the holes while retaining a full coverage of the porous laminated material with a bonded top coat of ceramic composition to resist heat impingement on the exposed surface of the porous laminated material.

Still another object of the present invention is to provide an improved method for coating a heat resistant ceramic composition on the exposed surface of a porous laminate having air flow holes therefrom without plugging the holes and including the steps of: continuously backflowing inert gas through the porous laminate for exit flow through the air flow holes continuously during the following steps of the coating process; grit blast roughening the exposed surface at an angle of attack normal to the surface to produce a roughened surface pattern thereon; directing a bond coat spray toward the exposed surface of the porous laminate at an angle in the range of 30° to 45° from an axis normal to the exposed surface so as to coat a thin bond coat layer on all of the exposed surfaces and on a limited portion of an inner surface of the laminate defining an internal passageway in communication with the air flow holes; and thereafter spray coating the laminate with a top ceramic coat of a composition requiring a bond coat layer to be adhered to the exposed surface and wherein the top coat spray angle is opposed to the spray angle of the bond coat spray angle and at an angle in the range of 45° from the axis normal to the exposed surface to cause the ceramic top coat material to be directed against the full bond coat surface on the outer planar extent of the exposed surface and at a point on the inner laminate surface spaced from the bond coat accumulation thereon thereby to limit bonding of the ceramic top coat in the passages communicating with the air flow holes so as to minimize flow restrictions through air flow holes resultant from the bonding of the heat resistant ceramic composition on the exposed surface of the porous laminate.

The details as well as other features and advantages of this invention are set forth in the remainder of the specification and are shown in the accompanying drawings, wherein:

FIG. 3 is an enlarged fragmentary, sectional view of a portion of a porous laminate used in practicing the invention at a diagrammatically illustrated surface roughening operation of the method of the present invention;

FIG. 4 is a view like FIG. 3 showing a subsequent bond coat operation in accordance with the method of the present invention;

FIG. 5 is a view like FIGS. 3 and 4 showing the laminate during a top coat process step in the sequence of the method of the present invention; and FIGS. 6 and 7 are diagrammatic views of the method of the present invention applied to an arrangement for coating the interior of a tubular member with wall portions thereon formed of porous laminated material.

Figure 1:
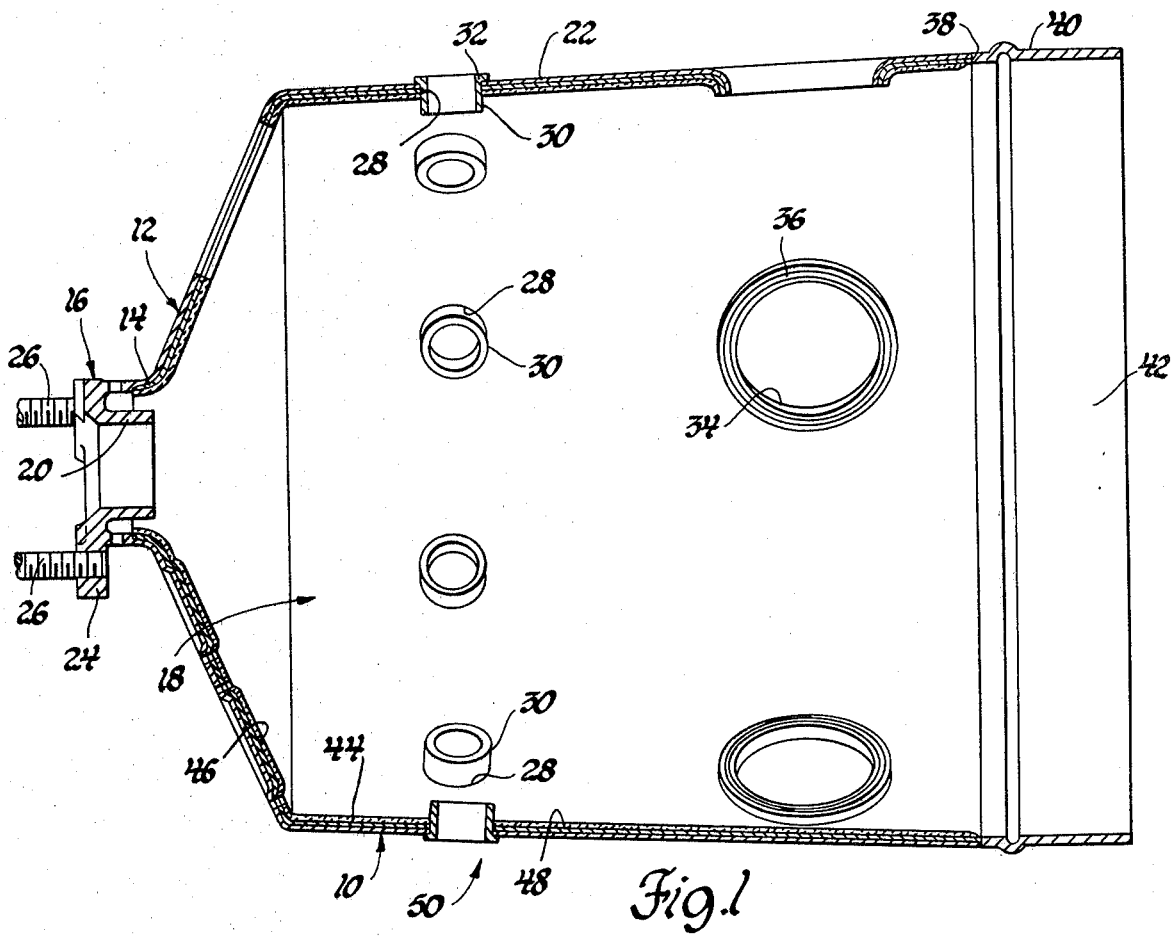
FIG. 1 is a view of a ceramic coated gas turbine engine combustion apparatus manufactured by the method of the present invention.

Referring now to the drawings, in FIG. 1, a combustor liner 10 is illustrated including a porous metal dome 12 having an inlet neck 14 thereon connected to a support member 16 for locating a fuel nozzle for supplying a combustible fuel component into a combustion chamber 18 formed by the porous metal dome 12 and a tubular segment 22 of porous metal.

More particularly, the support member 16 includes a support portion 20 inwardly telescoped in the inlet neck 14 on the dome 12. Furthermore, member 16 includes an outboard flange 24 having connector bolts 26 threadably received therein for securing the combustor liner with respect to a gas turbine engine block.

In the illustrated arrangement, the tubular segment 22 includes a plurality of circumferentially spaced openings 28 therein each having a primary air director thimble 30 directed therethrough and held in place by an outboard located flange 32 of circular configuration that engages the outer surface of the tubular segment 22.

Additionally, the tubular segment 22 includes a plurality of secondary openings 34 therein each formed by an inwardly bent circular edge 36 formed from the material of the tubular segment 22 and having a diameter and configuration to direct secondary air into the combustion zone or chamber 18. In the illustrated arrangement, the downstream edge 38 of the tubular segment 22 is welded to a transition member 40 defining an outlet 42 from the combustion chamber 18.

In the illustrated arrangement, the inner surface of the combustor liner 10 which is exposed to the combustion process within the combustion chamber 18 is covered by a heat resistant coating 44 that is applied, in accordance with the present invention, to the inner surface 46 of the dome 12 and the inner surface 48 of the tubular segment 22 of the combustor liner 10 in a manner to retain a desired flow of coolant air from the surrounding space 50 around the combustor liner 10 through the material of the porous metal dome 12 and the material of the porous metal tubular segment 22 during operation of a combustor including the illustrated combustor liner 10.

Figure 2:
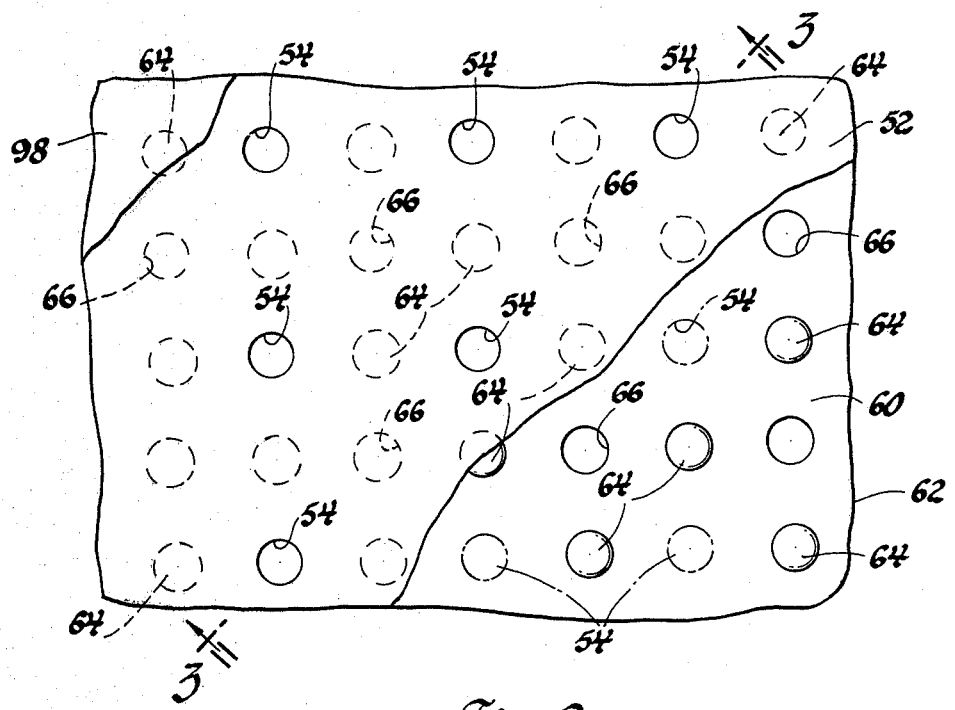
FIG. 2 is a partially broken away, planar projection of the inner surface of the liner of the combustion apparatus in FIG. 1.

More particularly, and in accordance with the present invention, the porous metal material of both the dome 12 and the tubular segment 22 is of the form shown in FIG. 2. It includes an inner layer 52 of material having a plurality of spaced apart air exit holes 54 therein. The air exit holes communicate with internal passages 56 formed by the outboard surface 58 of the inner layer 52 which faces the inboard surface 60 of an outer layer 62 of material which has a plurality of spaced apart buttons 64 formed thereon to space the outboard surface 58 from the inboard surface 60 so as to maintain free communication between the air exit holes 54 and the tortuous internal passages formed between the outer surface of each of the buttons 64 and the opposed surfaces 58, 60. Additionally, at points offset from the pattern of air exit holes 54 in the inner layer 52 of material, porous metal material includes a pattern of air entrance holes 66 in the outer layer 62 that direct cooler combustion air from the space 50 through the laminate of porous metal material into the combustion chamber 18. The illustrated arrangement is merely a representative form of a suitable porous metal laminated material for use in practicing the method of the present invention wherein layers such as layers 52, 62 are bonded into a porous metal laminate at contact points therebetween. The illustrated air hole patterns and others set forth in U.S. Pat. Nos. 3,584,972, issued June 15, 1971, to Bratkovich et al for Laminated Porous Metal and 4,004,056, issued Jan. 18, 1977, to Carroll for Porous Laminated Sheet, both with a common assignee to that of the present application, are also representative of those found in laminates improved by use of the method of the present invention.

In laminates of this type, heretofore, methods of directly applying a heat resistant ceramic coating to the porous laminated surface have produced undesirable plugging of the air flow holes in the coated surfaces. More particularly, in the illustrated application, the exit or discharge air holes from the porous laminated metal dome 12 and the porous metal tubular segment 22 are configured so that a portion of the internal passages 56 therein can be undesirably plugged during the coating operation.

Accordingly, in the present invention, an improved method of application of ceramic material reduces the amount of plugging of air flow holes such as holes 54. In practicing the invention, the preformed, porous metal laminated material including the inner layer 52 and the outer layer 62 is located at a surface roughening station 68 having a movable applicator 70 for directing a suitable material such as silicon carbide on aluminum oxide 60–100 grit into contact with the inner surface 72 of the inner layer 52 to produce a roughened texture 73 on the surface 72 as shown in FIG. 3. The angle of incidence of the grit material from the applicator 70, is at a right angle to surface 72 so that an inboard surface 74 is partially roughened during the operation.

During the operation of FIG. 3, the material is located in a plenum type fixture 75 with a sealed perimeter 77 and an inlet 79 for connection to a source of pressure. Thereby, a pressure differential is maintained from the outer surface 76 of the outer layer 62 to the inner surface 72 so as to direct an inert gas such as argon from inlet 79 into fixture 75. The gas continuously exits from the air exit holes 54 during processing at the station of FIG. 3 and during the subsequent processing steps shown in FIGS. 4 and 5. During roughening, the porous laminate is vibrated to cause the grit material to be backflushed on the inert gas flow therethrough. Following roughening of the inner surface 72 and selected portions of the inboard surface 72, the porous laminated material is located at a bond coat station 78. A plasma spray nozzle 80 is utilized at the bond coat station 78 to direct a bond coat composed of Alloy Metals Incorporated, Troy, Mich. 48084, NiCr AlY onto roughened texture 73. The bond coat is applied to a thickness of approximately 0.004 to 0.009 inches to produce a bond coat layer 82 on the roughened texture 73. The bond coat layer 82 is applied in a manner wherein the spray application angle 84 from the plasma spray nozzle 80 is at an angle of 45° to the inner surface 72. At this application angle, only a small build-up of bond coat material occurs on the inboard surface 74 and at a location somewhat offset from the grit roughened region on surface 74. The bond coat deposit is shown by reference numeral 86 in FIG. 4, and its limits are defined in part by the shielding action of the peripheral wall 88 of the air exit holes 54 as the spray from nozzle 80 passes therethrough into contact with surface 72.

The application of pressurized gas and back flow of inert gas through the air exit holes 54 is maintained during the bond coat process step to keep the exit holes 54 open.

Following the bond coat operation, the porous laminate is located at a top coat station 90 wherein a top coat of heat resistant ceramic composition is applied to the previously deposited bond coat layer 82. One suitable top coat ceramic composition is Metco 202 NS ($Y_2O_3$-$ZrO_2$) a zirconium oxide composite powder having a typical composition of 80% zirconium oxide and 20% yttrium, which is characterized as requiring a bond coat layer for its adherence to the metallic material of the porous metal laminated portions of the structure. In the illustrated arrangement, the porous metal material is Inconel Alloy 601 material having a limiting chemical composition of 58.0-63.0% nickel, and 21.0-25.0% chromium, the remainder being iron, with trace elements as follows: aluminum 1.0-1.7%, carbon 0.10% max., manganese 1.0% max., sulfur 0.015% max., silicon 0.50% max., and copper 1.0% max.

The top coat station 90 includes a plasma spray nozzle 92 for directing the heat resistant ceramic top coat material against the bond coat layer 82. In practicing the present invention, the angle of application 94 of the spray directed from the plasma spray nozzle 92 is opposite to angle 84 and is at an angle of 45° with respect to the surface of the bond coat layer 82. Thus, angles 84, 94 are opposite hand as shown in FIGS. 4 and 5, respectively.

The effect of top coat spray application in an opposed, opposite hand direction to that of the bond coat produces a separate top coat material deposit 96 shown in FIG. 5, at a point spaced from the bond coat deposit 86 on the inboard surface 60 of the outer layer 62. At this location, the top coat will not adhere to the metal of the porous laminated material and consequently tends to be removed by inert gas flushing action through holes 54 during formation of a protective ceramic top coat layer 98 across the full planar extent of the portions of the bond coat layer 82 that are on the inner surface 72 of the inner layer 52 across the full planar extent thereof.

Because of the reversal of direction of application of the top coat plasma spray at a 45° angle onto the bond coat layer 82, the blockage of the spray by the walls of holes 54 will produce a resultant structure with only a limited amount of material represented by part of the deposit 86 of bond coat material to block the area of flow through the exit hole. The change of direction of application of the spray coat can be produced by rotation of the substrate as well as relocation of the direction of the spray nozzles 80, 92. In either case, the change of the direction of spray between the coating steps lessens the tendency for the top coat ceramic material to bond in the holes at inner surfaces of the porous laminate as represented by surface 60 in the steps of FIGS. 3-5.

The amount of slant angle will vary dependent upon hole size, material compositions and other variables of production. Specimens with favorable performance were made at slant spray angle in the range of 30° to 45° from the axis normal to the coated surface. Also, the amount of reversal of bond coat spray angle to top coat spray angle may vary from opposite hand to angles which constitute only a relative 90° rotation between the direction of the respective spray angles (bond to top). The 180°, opposite hand, hand rotation is preferred. The off-axis slant spray as set forth above, causes the cooling air from the exit holes 54 to be deflected off normal to produce an exit flow pattern as shown by the vector 100 in FIG. 5 which will produce a direction of air flow across the inner surface of the combustor liner 10 to produce a thermal barrier thereacross to protect the metal layer along with the heat resistant properties of the ceramic coat that is formed by the process of the present invention.

One specimen disc manufactured from a porous laminated material of 601 alloy demonstrates the following air flow data at five differential pressure conditions before and after applying the plasma spray coating on the specimen piece. The piece was grit blasted at an angle of incidence from 20°-30° from an axis normal to the coated surface. The bond coat was applied at a spray angle opposite hand to the grit blast and the top coat was applied at a 90° rotation from the bond coat angle. Both the bond coat and top coat angles of incidence were 30° from a normal axis to the coated surface.

| Specimen Slant Sprayed - Argon Pressure to Specimen - 79 PSI During Spray Coating | | | | |
|---|---|---|---|---|
| ΔP Across Lamilloy | | Seconds to Flow 10 Ft$^3$ of Air | | Reciprocal Flow Time Ratio |
| Inch of Hg | PSI | Before Coating | After Coating | % |
| 4 | 2.0 | 452 | 473 | 96 |
| 8 | 3.9 | 310 | 373 | 96 |
| 12 | 5.0 | 249 | 257 | 97 |
| 20 | 9.0 | 185 | 191 | 97 |
| 30 | 14.7 | 145 | 148 | 98 |

Another specimen measuring approximately 2.5 inches in diameter was mounted on a short tube section. Thermocouple instrumentation was attached to the backside of the porous laminate corresponding to the surface 76 in FIG. 3 and front face temperature measurements were made with an optical pyrometer. Then the tube was supported in a test rig with the ceramic coated surface exposed to a burner temperature cycling sequence. Care was taken with the pyrometer measurements to avoid readings that were the result of reflection of flame luminosity or values which did not correct for surface emissivity from the ceramic top coat on the test piece. The reported data indicated that the coated disc survived over one thousand temperature cycles to 1650° F. and seventy-five cycles to 1800° F.

In accordance with the present invention and as shown in FIGS. 6 and 7, coating of a cylindrically configured burner can 102 of porous laminated material of the type discussed above can be coated with an internal layer of heat resistant ceramic material 104. In this case, the burner can 102 is pressurized by a supply tube 106 in an end wall 108 of a rotatable fixture. Burner can 102 is rotated in a direction represented by the arrow 109 during a grit blasting step produced by grit blasting mechanism 110 and a grit blasting nozzle 112 located within the interior of the burner can 102 at a right angle to inner surface 114 of burner can 102 to produce a roughened surface 116 thereon.

Then, as shown in FIG. 7, the burner can 102 and its roughened surface 116 is located with respect to a bond and top coat operating station 118 located internally of the burner can 102. A plasma spray nozzle 120 is operative to direct a slant angle spray onto surface 116 to form a bond coat layer of the type discussed in the embodiments shown in FIGS. 3 through 5 as the burner can 102 is rotated in the direction shown by arrow 122 in FIG. 7.

Then the burner can 102 is rotated in an opposite direction represented by the arrow 124 and a top coat of heat resistant ceramic material of the type discussed with reference to the top coat station and spray steps shown in the previous embodiment to bond against the previously applied bond coat layer. Again, with the proper selection of the angle of incident of the plasma spray against the rotating circular inner surface 114 of the burner can 102, and reversal of direction of the bond coat to top coat applications, there will be a minimal build-up of flow blocking material with respect to the exit hole of the porous laminated material.

As in the previous embodiment, backflow of inert gas is maintained across the porous laminate during the process steps.

While the embodiments of the present invention as herein disclosed, constitute a preferred form, it is to be understood that other forms might be adopted.

The embodiments of the invention in which an exclusive property or privilege is claimed are defined as follows:

1. A method for coating a heat resistant ceramic composition material on an exposed surface of an air cooled porous metal laminate having air flow exit holes therefrom formed in part by an internal surface of the laminate exposed in part through said exit holes comprising the steps of: roughening the exposed surface; backflowing inert gas through the laminate for exit through the exit holes continuously during the following steps of the process; directing a bond coat spray toward said exposed surface at a slant angle from an axis normal to the roughened exposed surface so as to coat a thin bond coat layer on all of the exposed surface and on a portion of the internal surface exposed through each exit hole at the slant angle of the directed bond coat; and thereafter directing a top coat spray of a ceramic coat requiring a bond coat layer thereunder for adhesion toward said exposed surface at a slant angle from said normal axis so as to coat all of said exposed surface with said top coat and a portion of the internal surface exposed through each exit hole at the slant angle of the directed top coat spray, the direction from which said top coat is sprayed being different than the direction from which said bond coat is sprayed so that the ceramic top coat is directed against a portion of the internal surface having only a limited bond coat deposit thereon so as to reduce bonding of the ceramic top coat in the exit holes thereby to minimize plugging of said exit holes during coating of the exposed surface of the laminate with heat resistant ceramic composition material.

2. A method for coating a heat resistant ceramic composition material on an exposed surface of an air cooled porous metal laminate having air flow exit holes therefrom formed in part by an internal surface of the laminate exposed in part through said exit holes comprising the steps of: backflowing inert gas through the laminate for exit through the exit holes continuously during the following steps of the process; grit blasting the exposed surface to produce a roughened pattern thereacross; directing a bond coat spray toward said exposed surface at a slant angle from an axis normal to the roughened exposed surface so as to coat a thin bond coat layer on all of the roughened exposed surface and on a portion of the internal surface exposed through each exit hole at the slant angle of the directed bond coat; and thereafter directing a top coat spray of a ceramic coat requiring a bond coat layer thereunder for adhesion toward said exposed surface at a slant angle from said normal axis so as to coat all of said exposed surface with said top coat and a portion of the internal surface exposed through each exit hole at the slant angle of the directed top coat spray, the direction from which said top coat is sprayed being different than the direction from which said bond coat is sprayed so that the ceramic top coat is directed against a portion of the internal surface having only a limited bond coat deposit thereon so as to reduce bonding of the ceramic top coat in the exit holes thereby to minimize plugging of said exit holes during coating of the exposed surface of the laminate with the heat resistant ceramic composition material.

3. A method for coating a heat resistant ceramic composition material on an exposed surface of an air cooled porous metal laminate having air flow exit holes therefrom formed in part by an internal surface of the laminate exposed in part through said exit holes comprising the steps of: roughening the exposed surface; backflowing inert gas through the laminate for exit through the exit holes continuously during the following steps of the process; directing a bond coat spray toward said exposed surface at an angle in the range of from 30° to 45° from an axis normal to the roughened exposed surface so as to coat a thin bond coat layer on all of the exposed surface and on a portion of the internal surface exposed through each exit hole at the angle of spray of said bond coat; and thereafter directing a top coat spray of a ceramic coat requiring a bond coat layer thereunder for adhesion toward said exposed surface at an angle in the range of from 30° to 45° from said normal axis so as to coat all of said exposed surface with said top coat and a portion of said internal surface exposed through each exit hole at the angle of spray of said top coat, the direction from which said top coat is sprayed being rotated between about 90° and 180° from the direction from which said bond coat is sprayed so that the ceramic top coat is directed against a portion of the internal surface having only a limited bond coat deposit thereon so as to reduce bonding of the ceramic top coat in the exit holes thereby to minimize plugging of said exit holes during coating of the exposed surface of the laminate with heat resistant ceramic composition material.

4. A method for coating a heat resistant ceramic composition material on an exposed surface of an air cooled porous metal laminate having air flow exit holes therefrom formed in part by an internal surface of the laminate exposed in part through said exit holes comprising the steps of: backflowing inert gas through the laminate for exit through the exit holes continuously during the following steps of the process; grit blasting the exposed surface to produce a roughened pattern thereacross; directing a bond coat spray toward said exposed surface at an angle of about 45° from an axis normal to the exposed surface so as to coat a thin bond coat layer on all of the exposed surface and on a portion of the internal surface exposed through each exit hole at the angle of spray of said bond coat; and thereafter directing a top coat spray of a ceramic coat requiring a bond coat layer thereunder for adhesion toward said exposed surface at an angle of about 45° from said normal axis so as to coat all of said exposed surface with said top coat and a portion of said internal surface exposed through each exit hole at the angle of spray of said top coat, the direction from which said top coat is sprayed being rotated 180° from the direction from which said bond coat is sprayed so that the ceramic top coat is directed against a portion of the internal surface having only a limited bond coat deposit thereon so as to reduce bonding of the ceramic top coat in the exit holes thereby to minimize plugging of said exit holes during coating of the exposed surface of the laminate with heat resistant ceramic composition material.

* * * * *